(12) United States Patent
Williams

(10) Patent No.: US 7,454,019 B2
(45) Date of Patent: Nov. 18, 2008

(54) SYSTEM AND METHOD FOR CONTROLLING DISPLAY OF COPY-NEVER CONTENT

(75) Inventor: Jim C. Williams, Yorba Linda, CA (US)

(73) Assignee: Motion Picture Association of America, Sherman Oaks, CA (US)

( * ) Notice: Subject to any disclaimer, the term of this patent is extended or adjusted under 35 U.S.C. 154(b) by 645 days.

(21) Appl. No.: 11/006,063

(22) Filed: Dec. 6, 2004

(65) Prior Publication Data

US 2005/0180567 A1    Aug. 18, 2005

Related U.S. Application Data

(60) Provisional application No. 60/527,377, filed on Dec. 5, 2003.

(51) Int. Cl.
*H04N 7/167* (2006.01)
(52) U.S. Cl. ......................... 380/203; 705/57
(58) Field of Classification Search .................. 380/203
See application file for complete search history.

(56) References Cited

U.S. PATENT DOCUMENTS

| | | | |
|---|---|---|---|
| 6,370,321 B1 * | 4/2002 | Asada et al. .................. | 386/94 |
| 6,490,355 B1 | 12/2002 | Epstein | |
| 6,850,619 B1 * | 2/2005 | Hirai .......................... | 380/203 |
| 6,865,675 B1 * | 3/2005 | Epstein ....................... | 713/176 |
| 7,088,822 B2 * | 8/2006 | Asano ......................... | 380/45 |
| 2003/0175013 A1 * | 9/2003 | Kato et al. ..................... | 386/94 |
| 2003/0185417 A1 * | 10/2003 | Alattar et al. ............... | 382/100 |
| 2004/0073916 A1 * | 4/2004 | Petrovic et al. ............... | 725/18 |
| 2005/0125357 A1 * | 6/2005 | Saadat et al. .................. | 705/57 |

OTHER PUBLICATIONS

International Search Report and Written Opinion, PCT/US/2004/040862.

* cited by examiner

*Primary Examiner*—Kambiz Zand
*Assistant Examiner*—Dant B Shaifer Harriman
(74) *Attorney, Agent, or Firm*—Connolly Bove Lodge & Hutz LLP; Jonathan A. Jaech

(57) ABSTRACT

A method and system for controlling the use of unauthorized content, and specifically for controlling the display of content that is marked as "copy-never." A compliant signal source transmits a video signal along with a secure timestamp to a compliant display device. The compliant display device determines whether the video signal is authorized to be displayed by determining the content management usage rights status in the video signal and the delay between when the video signal was transmitted and when it was received. In an embodiment of the invention, copy-never content that exceeds a defined delay between transmission and reception is prevented from being displayed.

36 Claims, 4 Drawing Sheets

SYSTEM AND METHOD FOR CONTROLLING DISPLAY OF COPY-NEVER CONTENT

CROSS-REFERENCE RELATED TO APPLICATION

This application claims priority pursuant to 35 U.S.C. § 119(e) to U.S. provisional application Ser. No. 60/527,377. filed Dec. 5, 2003, which application is specifically incorporated herein, in its entirety, by reference.

BACKGROUND OF THE INVENTION

1. Field of the Invention

The present invention relates generally to a method and system for controlling the use of unauthorized content, and specifically for controlling the display of content that is marked as "copy-never."

2. Description of Related Art

Various techniques for copy protection of digital information such as music and movies in digital form are known in the art. For example, according to some prior art schemes for copy protection, digital content is marked or flagged to indicate whether and the extent to which the content may be copied. Such flags or marks may include "copy freely," "copy once," and "copy never." As used herein, copy never (or "copy-never") indicates that further copying of the content is forbidden. Accordingly, when a compliant recording device—one that is looking for content usage right management information—detects the copy-never mark, the compliant recording device will not copy the content. Well-known techniques for marking the content with content usage rights include using the Analog Protection System (APS), Copy Generation Management System for Analog (CGMS-A), Copy Generation Management System for Digital (CGMS-D), and watermarking.

However, such copy protection schemes are subject to certain weaknesses. For example, while compliant recording devices may be prevented from making a copy of copy-never content, there is nothing to prevent an output stream from a media playing device, such as a DVD player, D-VHS player, HD DVD player, computer, or from a broadcast system, from being copied by a non-compliant recording device—one that is not looking for content usage rights management information (such as copy never) and can therefore still copy the content despite the existence of a copy-never mark. Accordingly, illegal copies of copy-never content may be created, which can then be processed or displayed (but not copied) on compliant devices.

It is desirable, therefore, to provide a method and system for controlling the use of illegally copied content by compliant display devices, that overcomes the limitations of the prior art.

SUMMARY OF THE INVENTION

The present invention provides a method and system for controlling the use of content that more effectively prevents the use of illegally copied content. In an embodiment of the invention, a display device is prevented from displaying content marked as copy-never, unless the content is received within a specified amount of time from that indicated by a time-of-play indicator. The time-of-play and copy-never indicators may be securely embedded in the content using any suitable method known in the art, for example, encryption or watermarking.

In an embodiment of the invention, a display device comprises a television, computer monitor, personal data assistant (PDA), or similar device of any suitable construction that further comprises, without limitation, a cathode-ray tube, an LCD, or a gas plasma display. According to the prior art, such display devices are not configured to participate in copy protection schemes, unlike media players or recorders. Instead, display devices are typically used merely to receive a video signal and process it in a determinate fashion. In an embodiment of the invention, however, a display device additionally includes systems for reading time-of-play and copy-never indicators, determining a current time, and handling the video signal according to the status of those indicators. For example, if the time between when content is transmitted and when it is received exceeds a defined maximum amount of time, the display device may be configured to prevent or interfere with display of the received content. Similarly, the display device may be configured to prevent or interfere with display of the received content if the receiving apparatus does not receive an indication of when the content was transmitted when it otherwise knows that such mark should be present, evidence of tampering.

In addition, the display device may be provided with systems for determining a current time that is synchronized with the signal source (e.g., a media player, broadcaster, or other source of the video signal) that embeds the time-of-play indicator in the video signal. In an embodiment of the invention, the display device is able to synchronize with the signal source by periodically communicating with the signal source using a separate communication line, such as a telephone line. In the alternative, or in addition, synchronization may be accomplished in any other suitable fashion, such as by communicating over the same connection used for the video signal, or both having devices (the display device and the signal source) obtain a current time from a third-party timekeeper. Various third-party sources of reliable time are known in the art.

Thus, the present invention provides a system and method for preventing the display of unauthorized copies of recorded content on compliant display systems. Operation of the method may further be illustrated by the following example. As an initial step, a media player or other source of a video signal may determine whether particular content is marked as copy-never. If the content is marked copy-never, before the media player communicates the content to an external device, such as a display or storage device, the media player may insert a secure indicator, such as a watermark, into the video signal. The secure indicator may indicate that the video signal is copy-never content, or originated from copy-never content.

In addition, the secure indicator may include a mark or timestamp indicating the current time and date, which may be obtained from an internal or external clock, or in the alternative, the current time and date may be inserted in a second secure indicator embedded in the video signal. Time and date may be recorded in any suitable time format.

Upon receiving the video signal, the display device may determine whether the video signal contains a copy-never indicator. If a copy-never indicator is detected, the display may also determine whether the video signal contains a time-of-play indicator. If detected, the display device compares the time-of-play indicator with the time obtained from an independent source, such as an internal or external clock, and determines a time lag. If the time lag exceeds a defined maximum, the display device prevents normal display of the content, or completely prevents display of the video signal.

Thus, for example, if the video signal originated from a compliant media player directly connected to a compliant display device and playing an authorized copy of media content, the content would display normally because it would contain the required secure indicators, and the time lag measured by the display device would not exceed the defined maximum. If, on the other hand, the otherwise compliant video signal was copied and later transmitted to the compliant display device, this would introduce a time lag that would likely exceed the maximum permissible lag, preventing normal display of the video signal.

Likewise, if the otherwise compliant video signal was transmitted to a remote display device not authorized for use of the content, depending on the remoteness of the receiving device this would also introduce a time lag measurably greater than would be expected for transmission to a nearby display device. As for video signals from non-compliant sources, these can be identified as such and prevented from normal play by compliant display devices.

The maximum permissible time lag may vary depending on the network over which the video signal is permitted to be transmitted. In the case of protection against unauthorized copying, the granularity of the secure time could be on the order of minutes or even tens of minutes. In the case of protection against unauthorized remote viewing, the granularity of the secure time could be on the order of milliseconds or less to distinguish between transmission latencies for direct analog connections or local area network digital connections and wide area network digital connections. For example, if redistribution is only permitted over a direct connection, the expected time lag may approach the cable length divided by the speed of light. Other transmission networks, for example the Internet, should introduce easily detectable delays in comparison to a relatively short direct connection, such as cables routed within a single home or apartment. For further example, there should also be a statistically significant difference in transmission time between distribution over a local area network, and distribution to a distance device over a wide area network. Such differences may be characterized by one of ordinary skill, and used as a basis for determining a maximum acceptable time lag.

In addition, the length of a maximum acceptable delay may depend on the business model used for distribution of the content in question. For example, a time lag on the order of about 1-1000 ms, such as about 7 ms, may be useful to restrict distribution to near-instantaneous viewing within a close physical proximity. On the other hand, longer delays may prove useful for content distributed under business models that allow for reasonable pausing of content. For such content, maximum acceptable delays on the order of one or several hours, or 1 to 100 minutes, such as about 90 minutes, may be useful. The invention is not limited to any particular definition of maximum delay.

A more complete understanding of the system and method for preventing the display of unauthorized contenr on compliant display systems will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a method and system that satisfies the need for a more secure method and system for controlling the use of illegally copied content, by preventing the normal display of a received video signal that is not authorized. In the detailed description that follows, like element numerals are used to indicate like elements appearing in one or more of the figures.

Figure 1:
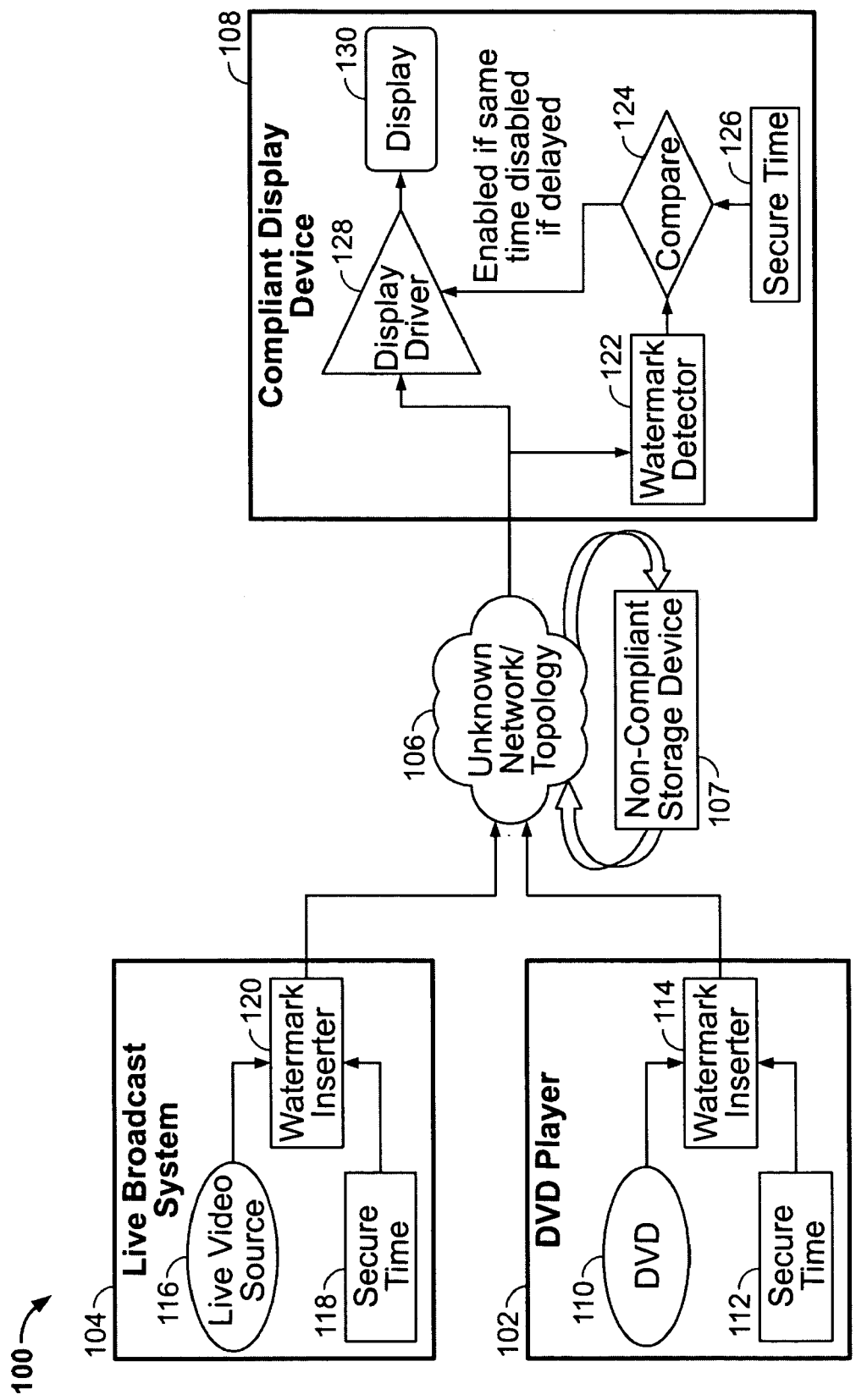
FIG. 1 is a diagram showing an exemplary system for controlling the display of content according to the invention.

FIG. 1 shows a system 100 for preventing normal display of a received video signal that is not authorized for use at a display device. System 100 comprises signal sources 102 and 104 provided on a network 106 such as the Internet, and a compliant display device 108 operatively coupled to the network 106. Digital content such as a video or audio signal intended for a media driver may be vulnerable to being intercepted and stored on a storage device 107 as it passes through the unknown network. Thus, the signal may emerge from the network 106 and arrive at multiple display devices at different times. Without some method of determining whether the video or audio signal has been duplicated or sent off to a prohibited remote location, even a copyright management-compliant source device may be caused to operate in an unauthorized fashion.

Signal sources 102 and 104 are intended to be illustrative, and not limiting, as to the specific types of devices employed. Display device 108 may be operatively connected to signal source 102 or 104 through the network 106, utilizing any suitable hardware or software system equipment as known in the art.

Signal source 102 processes copy-never content that is prerecorded on media 110, such as a DVD, to generate a video signal. Signal source 102 comprises a secure time source 112 and an encoder 114 such as a watermark inserter for embedding a secure timestamp in the video signal. Other suitably robust systems known in the art, such as the use of VEIL marks, may be used to reliably embed the secure timestamp or other information in the video signal.

Similarly, signal source 104 broadcasts a video signal generated from a live video source 116. Signal source 104 comprises a secure time source 118 and an encoder 120 such as a watermark inserter for marking or embedding a secure timestamp in the video signal. Encoder 120 may also be configured to embed a copy-never indicator into the video signal. Preferably, the video signal is marked in real-time, or near real-time, as to prevent introducing noticeable delay into the transmission of the video signal. Any suitable hardware or software system may be used to embed the information in the video signal, in real-time or otherwise, as is known in the art. In the alternative, signal source 104 may broadcast a prerecorded video signal already marked as copy never, thereby alleviating the need for encoder 120 to embed a copy-never indicator into the video signal. In such case, only the timestamp need be inserted at the time of broadcast.

Display device 108 comprises a detector 122, comparator 124, secure time source 126, display driver 128, and display 130. Detector 122 and display driver 128 are operatively connected to network 106 for receiving the video signal containing the watermark. Detector 122 detects the copy-never indicator and the secure timestamp embedded in the video signal. Detector 122 is operatively connected to a comparator 124, and provides information from the secure timestamp to the comparator 124.

Comparator 124 is also operatively connected to a secure time source 126 and to display driver 128. Comparator 124 compares the secure timestamp with the time indicated by the secure time source 126. If the difference between the time indicated by the secure time source 126 and the secure timestamp is greater than a defined delay, or if detector 122 does not detect a secure timestamp in the first place when it otherwise knows that one should exist, comparator 124 sends a signal to display driver 128 to disable or modify the display of the content. For example, the display may scramble the content or blank the screen. Optionally, the display driver may display a message on the screen indicating a problem with authorization has been detected. Other configurations to ultimately prevent the normal display of a received video signal besides disabling the display driver may also be suitable, and one of ordinary skill may readily implement such configurations using any known circuitry or programming language.

If the difference between the time indicated by the secure time source 126 and the secure timestamp is less than or equal to a defined delay, comparator 124 may send a signal to display driver 128 to enable display driver 128. In the alternative, the comparator 124 may not send a signal to display driver 128 if the state (enabled or disabled) of display driver 128 does not need to change. For example, if display driver 128 is enabled, the absence of a signal from the comparator 124 may result in normal processing of the video signal by driver 128.

Figure 2:
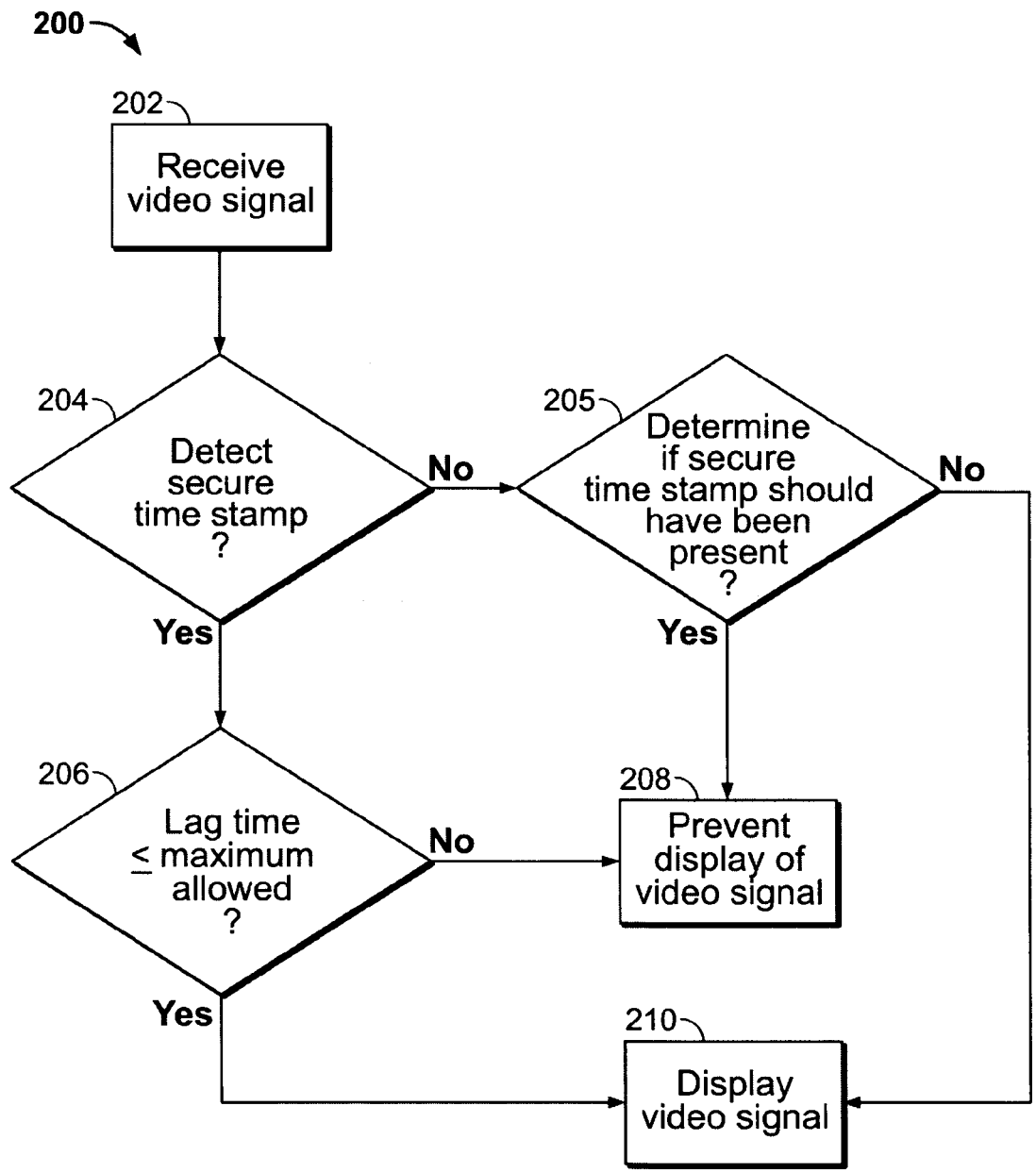
FIG. 2 is a flow diagram showing exemplary steps of a method for controlling the display of content.

FIG. 2 shows exemplary steps of a method 200 for preventing the normal display of an unauthorized video signal in conjunction with elements of system 100. Other or different steps may also be suitable, and one of ordinary skill may readily implement such steps using any suitable programming languages and methods. Being configured to accept signals from compliant signal sources, at step 202, display device 108 receives a video signal. At step 204, display device 108 determines whether a secure timestamp is associated with the video signal. Data such as a secure timestamp may be associated with or embedded in a video signal as is known in the art. For example, a timestamp may be placed in a vertical blanking interval, or in a video watermark. For further security, the timestamp may be encrypted using a known method, and decrypted by the receiving device.

If a secure timestamp is not detected ("N" at step 204), then normal display of the video signal may be prevented at step 208 if the system otherwise, using known methods including a priori knowledge or context, determines that such a mark should have been embedded in the video signal. If a secure timestamp is detected ("Y" at step 204), the lag between the video signal being transmitted by video source 102, for example, and display device 108 is calculated at step 206. If the lag is less than or equal to a defined maximum ("Y" at step 206), then normal display of the video signal may be allowed at step 210. If the lag is greater than a defined maximum ("N" at step 206), then normal display of the video signals may be prevented at step 208.

Figure 3:
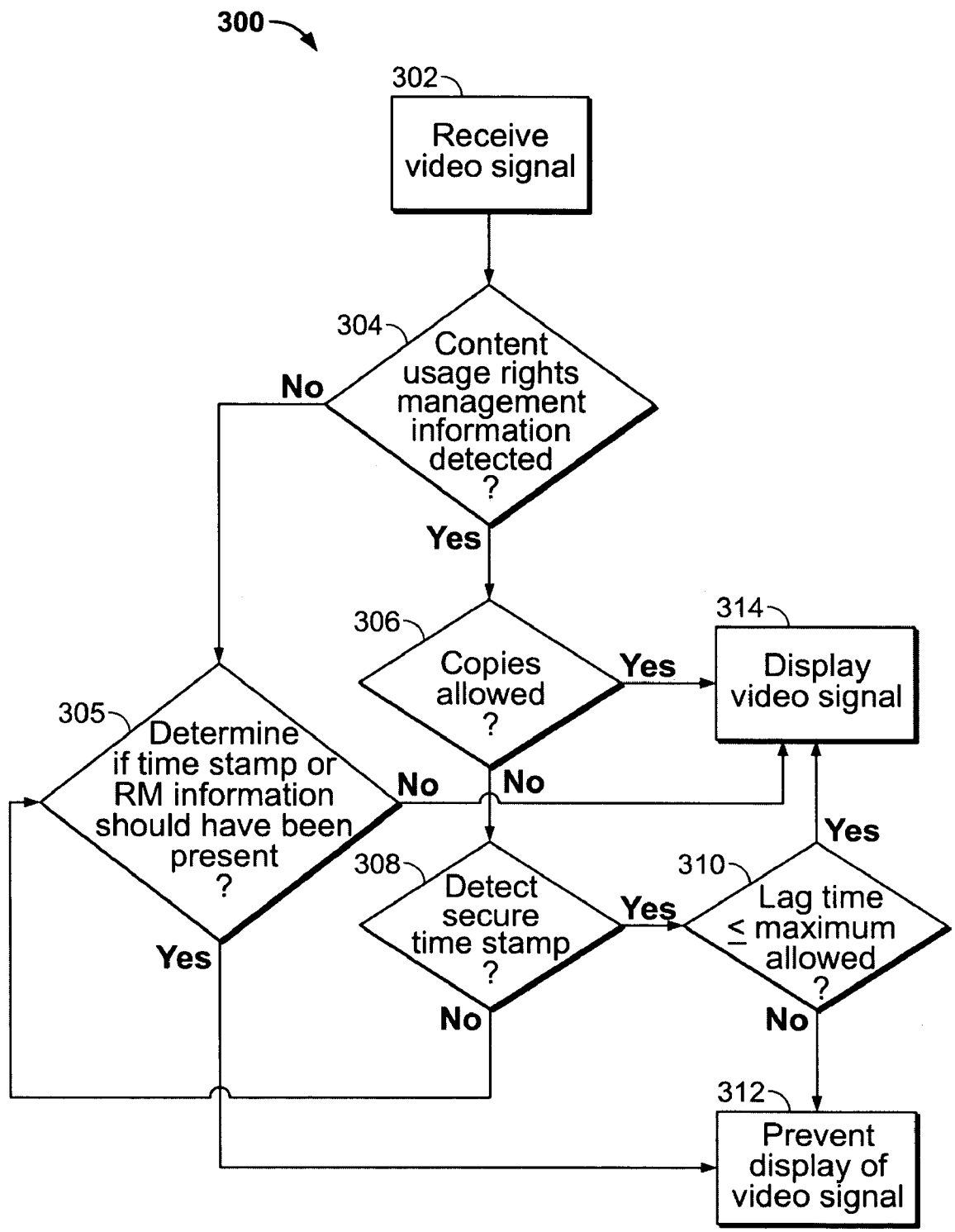
FIG. 3 is a flow diagram showing exemplary steps of an alternative method for controlling the display of copy-never content.

FIG. 3 shows exemplary steps of a method 300 for preventing the normal display of unauthorized copy-never content in conjunction with elements of system 100. Method 300 makes use of a timestamp in a manner similar to method 200, and in addition, checks for a copy-never indicator which is used to trigger authorization conditions partially different from method 200. At step 302, display device 108 receives a video signal. At step 304, display device 108 determines whether the video signal has associated content usage right management information. If no content usage rights management information is detected ("N" at step 304), then normal display of the video signal may be prevented at step 312, if the system otherwise determines ("Y" at step 305), using known methods including a priori knowledge or context, that such a mark should have been embedded in the video signal. If content usage rights management is not detected ("Y" at step 304), display device 108 may determine whether copies of the video signal are allowed at step 306. If copies are allowed ("Y" at step 306), then normal display of the video signal may be allowed at step 314. If copies are not allowed ("N" at step 306), then display device 108 determines whether a secure timestamp is associated with the video signal at step 308.

If a secure timestamp is not detected ("N" at step 308), then normal display of the video signal may be prevented at step 312, again subject to a determination ("Y" at step 305) that a timestamp should have been embedded in the video signal. If a secure timestamp is detected ("Y" at step 308), the lag between the video signal being transmitted by video source 102, for example, and display device 108 may be calculated at step 310. If the lag is less than or equal to a defined maximum ("Y" at step 310), then normal display of the video signal may be allowed at step 314. If the lag is greater than a defined maximum ("N" at step 310), then normal display of the video signals may be prevented at step 312.

Although the above embodiments have been described in terms of video signals and display devices, this invention may also be applicable to other types of signals, such as audio signals, which may be received by non-display devices, such as MP3 players or similar devices. As such, this invention may be used as a controlling function for any time of communication or transaction that is confined in time. In addition, to the embodiments of the system and method of the invention described above, the invention can be applied not only to display devices, but to any other systems for controlling the function of any type of communication or transaction that is confined in time.

Unfortunately, any content protection scheme may be circumvented by a determined infringer. Systems and methods for circumventing the present invention may include, for example, inserting a rogue copying device upstream of a compliant display device. The rogue device may be configured to masquerade as a compliant receiving device, a compliant source device, or both. That is, on the one hand, to a compliant receiving device, for example, a compliant display, the rogue device may appear to be a compliant source. On the other hand, to a compliant source device, for example a DVD player, the rogue device may appear to be a compliant receiving device. A rogue device that mimics both compliant source and compliant display behavior may be designed based on an analysis of compliant devices. And even if operational characteristics of the compliant devices have been effectively prevented from being discovered by inspection and analysis, information for overcoming a device's security features may be misappropriated. It should be apparent, therefore, that creation of a rogue device should be considered a possibility, even when stringent security measures have been used to prevent it.

Of course, the disclosure herein is not meant to condone or encourage illegal circumvention of copy-protection systems. To the contrary, it is hoped that the disclosure may serve to alert users of the copy-protection methods disclosed herein of potential circumvention techniques, and thus encourage more careful and secure implementation of the invention, as well as the development of further safeguards against circumvention.

Figure 4:
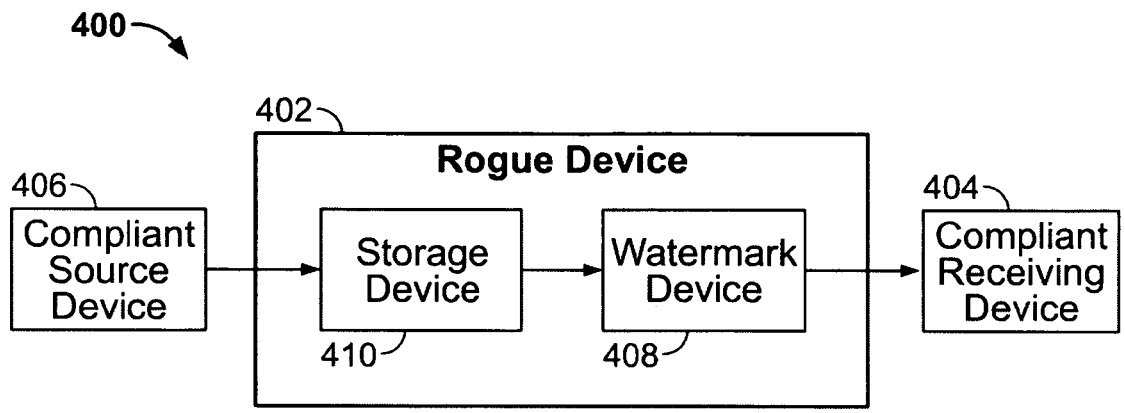
FIG. 4 shows an exemplary rogue device for circumventing a copy-protection system according to the invention.

FIG. 4 shows a rogue circumvention device 402 disposed in a system 400 of compliant devices designed to prevent the display of unauthorized video signals. FIG. 4 is similar to FIG. 1, in that compliant receiving device 404 of FIG. 4 parallels compliant display device 108 of FIG. 1, compliant source device 406 of FIG. 4 parallels signal source 102 or 104 of FIG. 1, and rogue device 402 of FIG. 4 parallels storage device 107 of FIG. 1. Rogue device 402 comprises a watermarking device 408 and a storage device 410. Storage device 410 is operatively connected to compliant source device 406 through a network, for example, for receiving a video signal containing a watermark. Storage device 410 is also operatively connected to watermark device 408. The use of watermark device 408 is intended to be illustrative, and not limiting. Other known devices may be employed as appropriate, depending on the copy-protection scheme implemented in system 400. Thus, watermark device 408 would be appropriate to identify the timestamp and/or the content usage rights management information embedded as a watermark in the video signal.

Watermark device 408 may adjust the timestamp to the time, or approximate time, that rogue device 402 transmits the video signal to the operatively connected compliant receiving device 404. The purpose of the modifying the timestamp is to remove the transmission delay that may be caused by the rogue device's interception of the video signal, and thereby allow for the normal display of the video signal by a compliant display device. Alternatively, or in addition, watermark device 408 may modify the content usage rights management information to change any copy-never indicator to copy-once or copy-freely, for example. Such modification of the content usage rights management may be effective in the case that system 400 allows the normal display of a video signal that is "copy-allowable" (or not copy-never) regardless of the timestamp associated with the video signal.

Storing of the received content allows rogue device 402 to transmit a "modified" video signal at an indeterminate time after receiving the video signal from compliant source device 406. In other words, at a subsequent time after storing the received video signal, rogue device 402 may output the video signal from storage device 410 to watermarking device 408 to modify the embedded timestamp and/or content usage right management information for transmission to any compliant receiving device. Any suitable storage device may be used to store the received content as is known in the art. For example, a hard drive, tape drive, CD, DVD, or random-access or flash memory may be used.

To the extent that communication between compliant source and receiving devices is effectively secured, it will not be possible for would-be infringers to successfully interpose a rogue device between them. Care should therefore be taken to secure these communications. However, presuming that rogue device 402 has been successfully configured and placed between compliant source device 406, and compliant receiving device 404, it may be possible to circumvent the protection methods disclosed herein, as follows.

Figure 5:
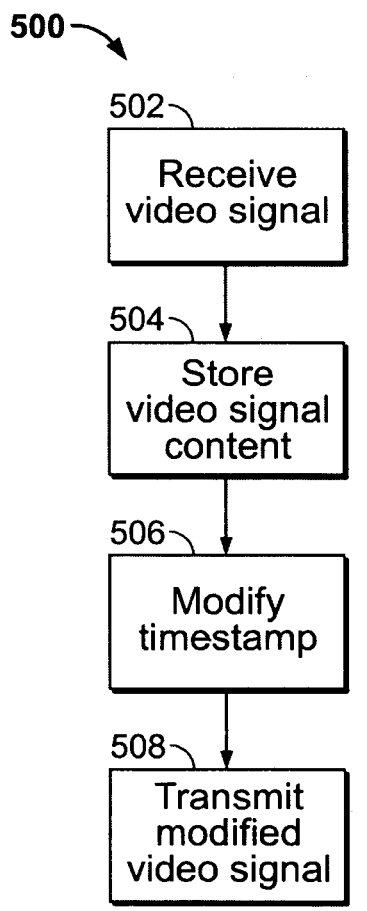
FIG. 5 shows exemplary steps of a method for circumventing a system for preventing normal display of an unauthorized video signal.

FIG. 5 shows exemplary steps of a method 500 for circumventing a system for preventing the normal display of unauthorized video signal in conjunction with elements of system 400. Initially, rogue device 402 receives content from a compliant source device 406 at step 502, and stores the content for later distribution to compliant or non-compliant display devices at step 504. Depending on the configuration of the timestamp (e.g., watermark or encrypted in the vertical blanking interval), the rogue device 402 replaces the original timestamp with a new timestamp bearing the time, or approximate time, of retransmission to a receiving device at step 506. At step 508, rogue device 402 may then transmit the modified content to compliant receiving device 404. Therefore, even if the receiving device is compliant with the methods disclosed herein, it may not be able to discern the true time lag from the original compliant content source and thus display the content normally.

Figure 6:
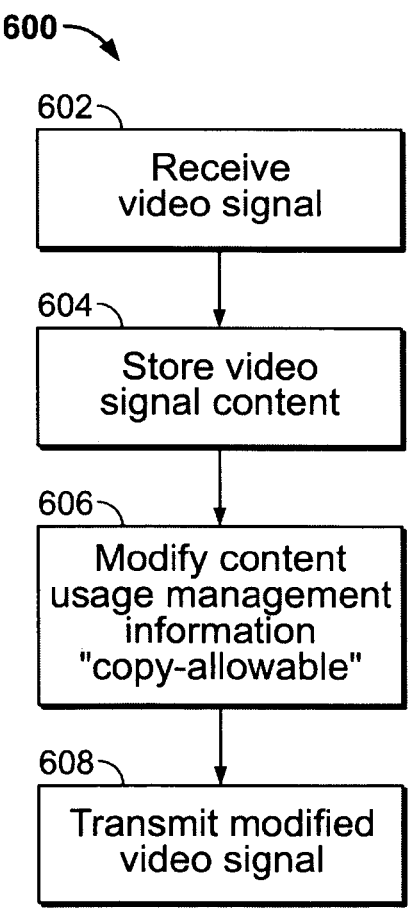
FIG. 6 shows exemplary steps of a method for circumventing a system for preventing normal display of an unauthorized video signal.

Alternatively, it may not be necessary to replace the timestamp in the case when the copying of the content is permitted. That is, a compliant display device may allow the normal display of a video signal, regardless of the transmission time, when copying of the content is permitted. Therefore, in an alternative embodiment, rogue device 402 may alter the content usage rights management information in the content. For example, a rogue device might change a "copy-never" indicator to "copy freely." FIG. 6 shows exemplary steps of a method 600 for circumventing a system for preventing the normal display of unauthorized video signal in conjunction with elements of system 400. Initially, rogue device 402 receives content from a compliant source device 406 at step 602, and stores the content for later distribution to compliant or non-compliant display devices at step 604. At step 606, rogue device 402 may replace a "copy-never" indicator with a "copy-freely" indicator. The step at which the content is stored may vary. For example, rogue device 402 may copy the content after the content usage rights management information has already been modified. At step 608, rogue device 402 may then transmit the modified content to compliant receiving device 404. Therefore, even if the receiving device is compliant with the methods disclosed herein, it may determine that the received content is authorized from the original compliant content source, and thus display the content normally.

Depending on how the methods disclosed herein are implemented, it may be easier to alter a timestamp than to alter the content usage rights management information. For example, a timestamp might consist of easily identified bits in a vertical blanking interval, while content usage rights management information may be placed in a watermark that is more difficult to read or alter. The converse may also be true. Either way, rogue device 402 may be configured to alter a minimal amount of information that is most readily accessed to circumvent the content protection methods disclosed herein. Any of these various circumvention methods, and systems for performing them, should also be considered within the scope of the invention.

Having thus described a preferred embodiment of a system and method for controlling use of copy-never content, it should be apparent to those skilled in the art that certain advantages of the invention have been achieved. It should also be appreciated that various modifications, adaptations, and alternative embodiments thereof may be made within the scope and spirit of the present invention. The invention is further defined by the following claims.

What is claimed is:

1. A method for preventing normal display of a received video signal that is not authorized for use at a display device, comprising:

receiving a video signal at a display device;

determining whether a secure timestamp is associated with the video signal;

calculating a transmission time lag by determining a difference between a time indicated by the secure timestamp and a time the video signal is first received by the display device; and preventing normal display of the video signal by the display device if the transmission time lag exceeds a defined maximum lag period, and displaying the video signal as a video image on the display device if the transmission time lag does not exceed the maximum lag period.

2. The method of claim 1, further comprising determining whether a copy-never indicator is associated with the video signal.

3. The method of claim 2, wherein the preventing step is not performed unless the copy-never indicator is associated with the video signal.

4. The method of claim 1, further comprising preventing normal display of the video signal if the secure timestamp is not associated with the video signal.

5. The method of claim 1, further comprising obtaining a value of the secure timestamp from the video signal.

6. The method of claim 1, further comprising obtaining a value of the secure timestamp from a defined portion of a vertical blanking interval of the video signal.

7. The method of claim 1, further comprising obtaining a value of the secure timestamp from a watermark contained in the video signal.

8. The method of claim 1, wherein the preventing step further comprises preventing normal display of the video signal if the time lag exceeds a number in the range of about 1 to 1000 milliseconds.

9. The method of claim 1, wherein the preventing step further comprises preventing normal display of the video signal if the time lag exceeds a number in the range of about 1 to 100 minutes.

10. The method of claim 1, further comprising decrypting a value for the secure timestamp using public and private keys.

11. A system for preventing normal display of a received video signal that is not authorized for use at a display device, comprising:

at least one signal source configured to output a video signal to a network, wherein the signal source associates the video signal with a secure timestamp indicating a time when transmission of the video signal is initiated; and at least one display device operatively connected to the network and configured to receive the video signal, the display device comprising a detector for detecting the secure timestamp associated with the video signal and a comparator for comparing the secure timestamp with a time at which the video signal is first received by the display device, wherein the display device prevents the normal display of the video signal if the difference between the time the video signal is first received by the display device and the time indicated by the secure timestamp is greater than or equal to a defined maximum, and if the difference is less than the defined maximum, displays a video image using the video signal.

12. The system of claim 11, wherein the detector further detects whether a copy-never indicator is associated with the video signal.

13. The system of claim 12, wherein the display device prevents the normal display of the video signal if both the copy-never indicator is detected and the difference between the time the video signal was received and the time indicated by the secure timestamp is less than or equal to a defined maximum.

14. The system of claim 11, wherein the display device prevents the normal display of the video signal if the detector fails to detect a secure timestamp associated with the video signal.

15. The system of claim 11, wherein the display device obtains a value of the secure timestamp from the video signal.

16. The system of claim 11, wherein the display device obtains a value of the secure timestamp from a defined portion of a vertical blanking interval of the video signal.

17. The system of claim 11, wherein the display device obtains a value of the secure timestamp from a watermark contained in the video signal.

18. The system of claim 11, wherein the display device prevents normal display of the video signal if the time difference exceeds a number in the range of about 1 to 1000 milliseconds.

19. The system of claim 11, wherein the display device prevents normal display of the video signal if the time difference exceeds a number in the range of about 1 to 100 minutes.

20. The system of claim 11, wherein the display device decrypts a value for the secure timestamp using public and private keys.

21. A method for circumventing a copy-protection system for preventing normal display of a video signal, wherein the copy-protection system associates a timestamp with the video signal and prevents normal display of the video signal if the time between the transmission of the video signal from a compliant source device and the reception of the video signal at a compliant display device exceeds a defined maximum, the method comprising:

receiving the video signal from the compliant source device, the video signal originating from a source device providing protected content of the copy-protection system and including a secure timestamp indicating a first time that the video signal originated from the source device and an indicator of the copy-protection system indicating that display of the protected content is restricted after elapse of a defined lag period beginning with the first time; and processing the received video signal to provide an altered video signal, wherein the altered video signal comprises the received video signal excluding the secure timestamp and a replacement timestamp indicating a second time, the second time being later than the first time, and the replacement timestamp replacing the secure timestamp in the received video signal.

22. The method of claim 21, further comprising transmitting the altered video signal to a compliant display device with the altered timestamp comprising information concerning a time of the transmitting.

23. The method of claim 21, further comprising transmitting the altered video signal to a compliant display device with an indicator of the copy-protection system indicating that copying of the protected content is allowed.

24. The method of claim 21, further comprising mimicking a compliant receiving device to the source device.

25. The method of claim 21, further comprising storing the received video signal.

26. The method of claim 21, further comprising storing the altered video signal.

27. The method of claim 21, further comprising processing at least one of the received video signal or the altered video signal to obtain decoded information substituting for the protected content.

28. The method of claim 27, further comprising storing the decoded information.

29. A system for circumventing a copy-protection system for preventing normal display of a video signal, wherein the copy-protection system associates a timestamp with the video signal and prevents normal display of the video signal if the time between the transmission of the video signal from a compliant source device and the reception of the video signal at a compliant display device exceeds a defined maximum, the system comprising:

- a computer operatively associated with a memory, the memory holding programmed instructions comprising:
- receiving the video signal from the compliant source device, the video signal originating from a source device providing protected content of the copy-protection system and including a secure timestamp indicating a first time that the video signal originated from the source device and an indicator of the copy-protection system indicating that display of the protected content is restricted after elapse of a defined lag period beginning with the first time; and
- processing the received video signal to provide an altered video signal, wherein the altered video signal comprises the received video signal excluding the secure timestamp and a replacement timestamp indicating a second time, the second time being later than the first time, and the replacement timestamp replacing the secure timestamp in the received video signal.

30. The system of claim 29, wherein the instructions further comprise transmitting the altered video signal to a compliant display device with the altered timestamp comprising information concerning a time of the transmitting.

31. The system of claim 29, wherein the instructions further comprise transmitting the altered video signal to a compliant display device with an indicator of the copy-protection system indicating that copying of the protected content is allowed.

32. The system of claim 29, wherein the instructions further comprise mimicking a compliant receiving device to the source device.

33. The system of claim 29, wherein the instructions further comprise storing the received video signal.

34. The system of claim 29, wherein the instructions further comprise storing the altered video signal.

35. The system of claim 29, wherein the instructions further comprise processing at least one of the received video signal or the altered video signal to obtain decoded information substituting for the protected content.

36. The system of claim 29, wherein the instructions further comprise storing the decoded information.

* * * * *